United States Patent
Malatack et al.

(10) Patent No.: US 9,483,328 B2
(45) Date of Patent: Nov. 1, 2016

(54) SYSTEM AND METHOD FOR DELIVERING APPLICATION CONTENT

(71) Applicant: Twilio, Inc., San Francisco, CA (US)

(72) Inventors: Patrick Malatack, San Francisco, CA (US); Cheuk To Law, San Francisco, CA (US); Thomas Wilsher, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 74 days.

(21) Appl. No.: 14/336,611

(22) Filed: Jul. 21, 2014

(65) Prior Publication Data

US 2015/0026477 A1 Jan. 22, 2015

Related U.S. Application Data

(60) Provisional application No. 61/856,541, filed on Jul. 19, 2013.

(51) Int. Cl.
| | |
|---|---|
| H04L 9/32 | (2006.01) |
| G06F 9/54 | (2006.01) |
| H04L 29/06 | (2006.01) |
| H04W 12/06 | (2009.01) |
| G06F 21/12 | (2013.01) |
| H04W 4/00 | (2009.01) |
| H04L 12/58 | (2006.01) |

(52) U.S. Cl.
CPC ............. *G06F 9/541* (2013.01); *G06F 21/121* (2013.01); *H04L 51/36* (2013.01); *H04L 63/123* (2013.01); *H04W 4/001* (2013.01); *H04W 12/06* (2013.01); *H04L 9/32* (2013.01); *H04L 51/32* (2013.01)

(58) Field of Classification Search
CPC ..... H04L 9/3281; H04L 63/08; H04L 63/10; H04L 63/20; G06F 21/10; G06F 21/6218; G06F 21/31
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Subramanya, et al. "Digital Signatures", IEEE Potentials, Mar./Apr. 2006, pp. 5-8.* NPL, "API Monetization Platform", 2013.
RFC 3986: Uniform Resource Identifier (URI): Generic Syntax; T. Berners-Lee, R. Fielding, L. Masinter; Jan. 2005; The Internet Society.
Complaint for Patent Infringement, *Telinit Technologies, LLC v. Twilio Inc.*, dated Oct. 12, 2012.

(Continued)

*Primary Examiner* — Ali Abyaneh
(74) *Attorney, Agent, or Firm* — Jeffrey Schox

(57) ABSTRACT

A system and method for messaging application content that includes providing an application content messaging application programming interface (API); receiving a content delivery request from an account, through the application content messaging API; retrieving device information of a destination endpoint specified in the content delivery request; based on the device information, selecting an application content format from a set of formats and obtaining application content in the application content format; and transmitting the application content.

17 Claims, 12 Drawing Sheets

(56) References Cited

U.S. PATENT DOCUMENTS

| | | |
|---|---|---|
| 5,934,181 A | 8/1999 | Adamczewski |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |

(56) References Cited

U.S. PATENT DOCUMENTS

| | | |
|---|---|---|
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,024,785 B2 | 9/2011 | Andress et al. |
| 8,046,823 B1 | 10/2011 | Begen et al. |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,139,730 B2 | 3/2012 | Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 * | 11/2012 | Corneille et al. ............. 370/313 |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,565,117 B2 | 10/2013 | Hilt et al. |
| 8,577,803 B2 * | 11/2013 | Chatterjee et al. ............. 705/41 |
| 8,582,450 B1 | 11/2013 | Robesky |
| 8,594,626 B1 | 11/2013 | Woodson et al. |
| 8,611,338 B2 | 12/2013 | Lawson et al. |
| 8,613,102 B2 | 12/2013 | Nath |
| 8,649,268 B2 * | 2/2014 | Lawson et al. ............. 370/236 |
| 8,667,056 B1 | 3/2014 | Proulx et al. |
| 8,675,493 B2 | 3/2014 | Buddhikot et al. |
| 8,695,077 B1 | 4/2014 | Gerhard et al. |
| 8,755,376 B2 | 6/2014 | Lawson et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,879,547 B2 | 11/2014 | Maes |
| 8,938,053 B2 | 1/2015 | Cooke et al. |
| 8,964,726 B2 | 2/2015 | Lawson et al. |
| 9,014,664 B2 | 4/2015 | Kim et al. |
| 9,015,702 B2 | 4/2015 | Bhat |
| 9,344,573 B2 | 5/2016 | Wolthuis et al. |
| 2001/0038624 A1 | 11/2001 | Greenberg et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0097639 A1 * | 5/2003 | Niyogi et al. ................ 715/526 |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2003/0233276 A1 * | 12/2003 | Pearlman et al. .............. 705/14 |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0125251 A1 | 6/2005 | Berger et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |

(56) References Cited

U.S. PATENT DOCUMENTS

| | | |
|---|---|---|
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1* | 9/2009 | Drukman et al. ............ 717/121 |
| 2009/0232289 A1 | 9/2009 | Drucker et al. |
| 2009/0235349 A1* | 9/2009 | Lai et al. ..................... 726/14 |
| 2009/0241135 A1* | 9/2009 | Wong et al. .................. 719/328 |
| 2009/0252159 A1 | 10/2009 | Lawson et al. |
| 2009/0276771 A1 | 11/2009 | Nickolov et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1* | 9/2010 | Korte et al. .................. 713/175 |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0312919 A1* | 12/2010 | Lee et al. .................... 710/14 |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1* | 4/2011 | Paul et al. .................... 715/234 |
| 2011/0083179 A1 | 4/2011 | Lawson et al. |
| 2011/0093516 A1 | 4/2011 | Geng et al. |
| 2011/0096673 A1 | 4/2011 | Stevenson et al. |

(56) References Cited

U.S. PATENT DOCUMENTS

| | | |
|---|---|---|
| 2011/0110366 A1 | 5/2011 | Moore et al. |
| 2011/0131293 A1 | 6/2011 | Mori |
| 2011/0143714 A1 | 6/2011 | Keast et al. |
| 2011/0145049 A1* | 6/2011 | Hertel et al. ............... 705/14.23 |
| 2011/0151884 A1 | 6/2011 | Zhao |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1* | 3/2013 | Cheung et al. ............... 713/176 |
| 2013/0067448 A1 | 3/2013 | Sannidhanam et al. |
| 2013/0097298 A1 | 4/2013 | Ting et al. |
| 2013/0132573 A1* | 5/2013 | Lindblom ............... 709/225 |
| 2013/0139148 A1* | 5/2013 | Berg et al. ............... 717/177 |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0058806 A1* | 2/2014 | Guenette et al. ............ 705/14.1 |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1* | 9/2014 | Lundell ............... 709/222 |
| 2014/0269333 A1 | 9/2014 | Boerjesson |
| 2014/0274086 A1* | 9/2014 | Boerjesson et al. ............ 455/450 |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1* | 1/2015 | Giakoumelis et al. ....... 370/328 |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0365480 A1 | 12/2015 | Soto et al. |

FOREIGN PATENT DOCUMENTS

| | | | |
|---|---|---|---|
| EP | 1464418 A | | 10/2004 |
| EP | 1522922 A2 | | 4/2005 |
| EP | 1770586 A1 | * | 4/2007 |
| EP | 2053869 A1 | | 4/2009 |
| ES | 2134107 A | | 9/1999 |
| JP | 10294788 | | 4/1998 |
| JP | 2004166000 A | | 6/2004 |
| JP | 2004220118 A | | 8/2004 |
| JP | 2006319914 A | | 11/2006 |
| WO | 9732448 A | | 9/1997 |
| WO | 02087804 | | 11/2002 |
| WO | 2006037492 A | | 4/2006 |
| WO | 2009018489 A | | 2/2009 |
| WO | 2009124223 A | | 10/2009 |
| WO | 2010037064 A | | 4/2010 |
| WO | 2010040010 A | | 4/2010 |
| WO | 2010101935 A | | 9/2010 |
| WO | 2011091085 A | | 7/2011 |

OTHER PUBLICATIONS

S. barakovic and L. Skorin-Kapov. "Survey and Challenges of QoE Management Issues in Wireless Networks". 2012, pp. 1-29.

"Ethernet to Token ring Bridge"—Black Box Corporation, Oct. 1999 http://blackboxcanada.com/resource/files/productdetails/17044.pdf.

* cited by examiner

```
$ curl -XPOST https://api.example.com/2010-04-01/Accounts/123/pass.json \
    -d "pass-config=http://developer-site.example.com/pass-config.zip" \
    -d "To=415-555-xxxx" \
    -d "From=415-555-yyyy" \
    -u 'account123:{AuthToken}'
```

FIGURE 4

# SYSTEM AND METHOD FOR DELIVERING APPLICATION CONTENT

CROSS-REFERENCE TO RELATED APPLICATIONS

This application claims the benefit of U.S. Provisional Application Ser. No. 61/856,541, filed on 19 Jul. 2013, which is incorporated in its entirety by this reference.

TECHNICAL FIELD

This invention relates generally to the application content field, and more specifically to a new and useful system and method for delivering application content in the application content field.

BACKGROUND

With more content being application based, there are a wider variety of application tools to accomplish similar tasks. Digital passes applications are one such type of application. Pass applications have been developed for various platforms that enable users to store tickets, gift cards, coupons, loyalty cards, store payment cards, and other forms of cards and passes. These pass applications enable multiple companies and pass providers to leverage a single application in providing their content. However, adoption of such digital passes is low because of the poor experience surrounding the passes. Many providers of passes require a user to install an application such that the pass can be delivered to the user. Not only is this a poor experience for the user, but also this development of the application is costly for the pass providers. Further complicating matters is that the depending on the device, the operating system, and the installed applications, each user may have different pass requirements. Thus, there is a need in the application content field to create a new and useful system and method for delivering digital passes. This invention provides such a new and useful system and method.

BRIEF DESCRIPTION OF THE FIGURES

FIG. 4 is an exemplary pass delivery API request;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Delivering Digital Passes

Figure 1:
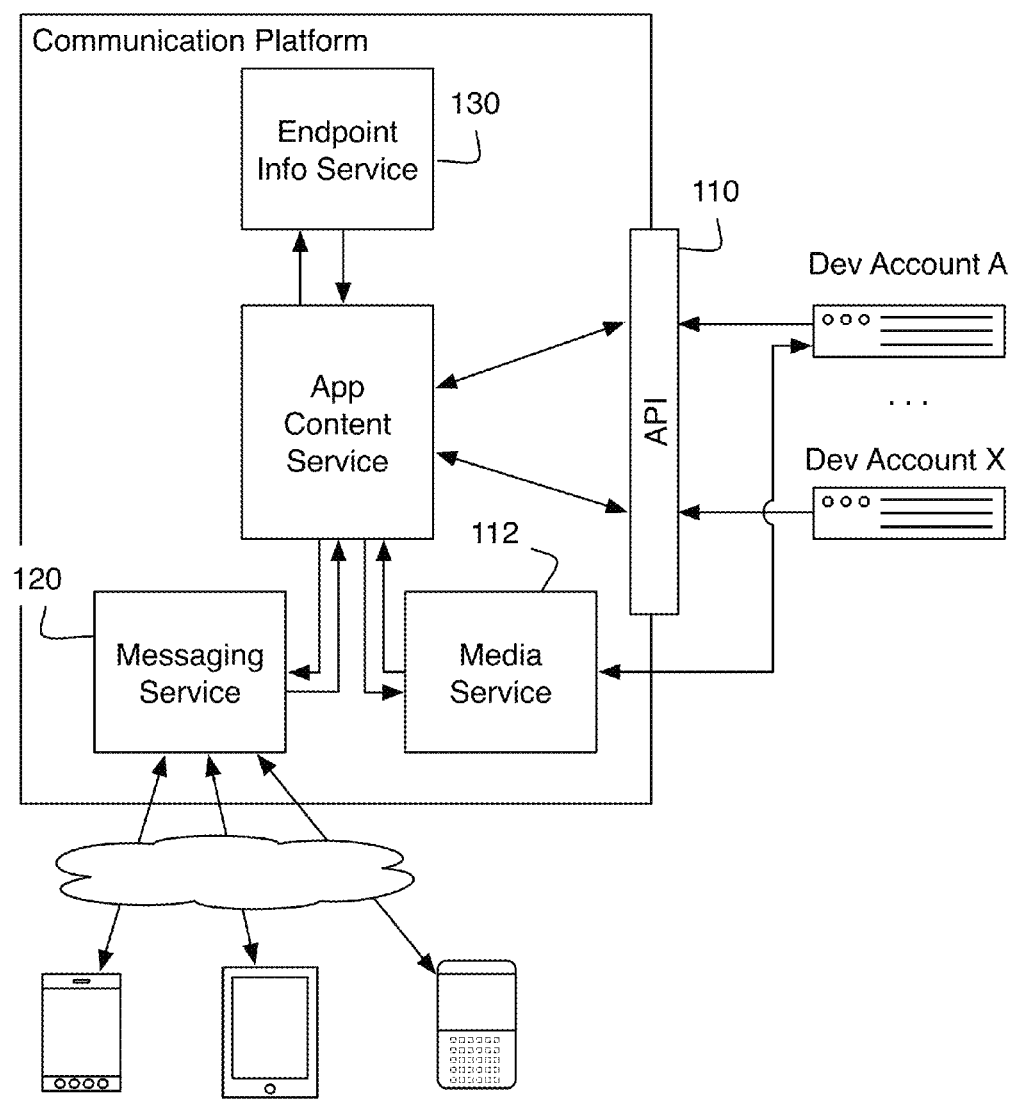
FIG. 1 is schematic representation of a system of a preferred embodiment.

As shown in FIG. 1, a system for delivering application content of a preferred embodiment comprises a content messaging API service 110, a telephony messaging service 120, and a telephony endpoint information resource 130. The system functions to create a unified delivery mechanism for application content that works across a variety of destination applications. The system preferably uses destination information relating to operating system, installed applications, preferred application, and/or other signals to dynamically select and obtain application content targeted for that particular destination. The system additionally functions to manage application formatting challenges such as digital signing, programmatic notifications associated with the content, and communication with the installed content. The system can be applied to one or more types of application content. The application content could include digital passes, home automation modules/configurations, digital data collections (e.g., personal health monitoring systems), events and calendars, location/people/business profiles, and/ or any suitable type of application content. In one particular variation, the application content includes a cryptographic component, wherein the cryptographic component may specify part or all of the content follows a particular security protocol. The application content may additionally be characterized as being installable or accessible through an outside delivery mechanism.

In one preferred embodiment, the system functions to create a unified messaging solution for digital passes. Passes preferably include any digital pass that can be collected with a plurality of other digital passes into a single application or operating service. For example, passes can include tickets, gift cards, coupons, loyalty cards, store payment cards, ID badges, invitations, and other forms of cards and passes that can be used with iOS's Passbook application, Android's Pass Wallet, or other operating systems and/or third party applications. Passes may be used by application developers for communicating a unique ID via a QR code, barcode, or other machine-readable code. Passes may receive updates and/or push notifications to be automatically or manually updated. Passes may be triggered based on location, time, and other suitable events and conditions. Passes may additionally be easily localized to different languages. The system abstracts away technical complexities of working with passes and simplifies the manner in which a pass can be delivered and installed on a device. Herein, digital passes may be used as primary examples, but any suitable type of application content may be used.

The system is preferably used by application and service providers/developers to enable easy transport and management of targeted digital content to mobile devices of end users. The system additionally functions to normalize the interactions taken by a developer such that a single interface can be used to deliver passes to a wide variety of different destinations. While the resulting application content is targeted and formatted according to the destination, a normalized and consistent mechanism enables a service to define application content. The system preferably uses MMS as a transport protocol for delivering passes, but any suitable communication protocol can be used to deliver the application content resources such as email, SMS, over the top IP communication (proprietary or open), or any suitable communication protocol. While the system is described for use with the preferred embodiment of digital passes, the system can alternatively be used for delivering other application media. For example, calendar events can additionally be sent. In another example, application specific content or settings can be delivered appropriately over telephony messaging.

The system is preferably integrated with a communication platform, which can be a multitenant platform that allows outside applications and services to programmatically interact over communication protocols. The communication protocols available to the communication platform can include SMS, MMS, IP messaging, PSTN calls, SIP calls, video calls, screen sharing sessions, and/or other forms of communication. The communication platform preferably includes an API accessible to developer accounts on the communication platform. Accounts of the communication platform use the API to programmatically interact with API resources. The API resources can be used to reference and query data and/or initiate or augment actions of the communication platform. The platform API is preferably a RESTful API but may alternatively be any suitable API such as SOAP. The API preferably works according to an HTTP request and response model. HTTP requests (or any suitable request communication) to the communication platform preferably observe the principles of a RESTful design. RESTful is understood in this document to describe a Representational State Transfer architecture as is known in the art. The communication platform can additionally include a capability to process telephony applications, and as such, the delivery of digital passes can be initiated and directed through directives of the communication platform. In a preferred implementation, the communication platform is substantially similar to the one described in U.S. Pat. No. 8,306,021, issued 6 Nov. 2012, which is hereby incorporated in its entirety by this reference.

The content API service 110 functions to enable programmatic interaction by developer accounts. The developer accounts can deliver passes, interact with passes, and receive information about the state of the passes. The content messaging API 110 is preferably a subset of the platform API of the communication platform, but may alternatively be a distinct interface for application content interactions. An account authentication engine preferably allows accounts, sub-accounts, and/or other entities to make requests. The accounts are preferably controlled, managed and associated with outside applications and services. The outside application services preferably use the system to facilitate the delivery of application content. The application messaging API can include several resources. An exemplary API call can include an HTTP POST to initiate a new action or modify a resource and an HTTP GET to read data or query information about a resource. The API 110 may alternatively use alternative forms of an interface. In one preferred implementation for digital passes, the content messaging API no can include a pass resource that can be used to transmit a pass to at least one destination. A HTTP POST to the pass resource initiates the transmission of a specified pass to a specified destination. Additionally or alternatively, multiple destinations may be specified in which case the application content is targeted individually to the specified destinations. An HTTP GET to the pass resource can return a list of the delivered passes. Each transmitted pass is preferably assigned a passID within the communication platform. A transmitted pass has a passID resource that can be used to access specific passes. Since passes are often delivered to a single user. A passID corresponds to a particular instance of a pass transmitted to one user device. The passID resource can be used to query information about a particular pass instance. Pass instance information can include delivery status (was the message received), installation status (was the pass installed by the user), the type of pass, and other suitable information. For example, a developer or application can send a HTTP GET message to a passID resource of "/pass/1234", and a json response can be returned that specifies if the pass was delivered, if the pass was installed, and if the pass is an iOS, Android, or static pass. A developer can update the pass by submitting an HTTP POST message to "/pass/12434", and in response, a push notification is delivered to the device to update the pass. In one variation, a message resource can be overloaded and be used for SMS, MMS, passes, and messaging of other media types. The handling of the media can be automatically determined based on the content type specified through a request.

The telephony messaging service 120 functions to transmit the application content media to the destination. The telephony messaging service preferably uses MMS as a transport communication channel. MMS can be used to send application content media in the native file format. In the case of digital passes, passbook passes on iOS can be transmitted as data objects of the mime-type pkpass. Passes delivered to Android would be transmitted as Android appropriate data objects. Most devices are capable of MMS communication, and as such, MMS provides a suitably accessible channel of communication. Even devices that are not considered smart phones can have basic MMS capabilities. If MMS isn't available, SMS communication may be available. Other forms of communication can include email, over the top IP communication, or any suitable form of communication. Static application content can be transmitted to non-smart devices either as images, web pages, or in another basic format. Additionally, many device operating systems with integrated pass support allow passes to be opened and installed from the messaging application. As shown in FIG. 2, a Passbook package is rendered with a media preview. Other types of application content can similarly be communicated, opened, and directed to a relevant application. Upon receiving user selection (e.g., tapping the preview), the relevant application is opened and the pass is installed in the application. SMS can alternatively be used. Instead of delivering the pass media, a link is delivered, which when clicked directs a user to a webpage with pass installation functionality, a web app version of a pass, and/or a static version of the pass. An IP based messaging communication can alternatively or additionally be used. IP based messaging can target particular applications. Social network messaging systems and internet chat applications are examples of applications that use IP based messaging communication.

The telephony endpoint information 130 resource functions to provide information pertaining to the type of device, which can direct the mode of pass delivery. Format and functionality of a pass can vary greatly between operating systems and/or applications. The telephony endpoint information resource enables the right type of pass to be delivered to a specific device. A repository or a database of the telephony endpoint information resource stores communication endpoint data. A communication endpoint preferably has a record stored in a database or distributed through several database tables. An endpoint record preferably includes information pertaining to the type of pass supported by the device. The endpoint record can include the device type, the operating system version, and/or the installed applications (e.g., what supported pass applications are installed). The endpoint record can additionally store information such as a unique identifier of the telephony endpoint, the direct inbound address (e.g., the phone number or short code), carrier, origin properties, a cleanliness/quality score, capability properties (e.g., SMS, MMS, Fax, etc.), status (e.g., mobile, landline, client application type, toll free, etc.), screen resolution and display capabilities, language, service plan (e.g., do they get free SMS/MMS messages), activity patterns (e.g., when is the communication, who does the endpoint communicate with, what does the endpoint communicate, etc.) and/or other suitable properties of a telephony endpoint. Origin properties can include NPs (e.g., area code), NXX (e.g., three digit vanity digits of a number), ISO country codes, region properties and/or any suitable origin properties. The records may include various sets of information depending on the information that is collected. Some destination endpoints may not have sufficient data in which case a default type of pass may be delivered. In some situations, the type of pass may be used to obtain information about the device, which can later be used to deliver a more appropriate form of the pass. The endpoint records are preferably populated by retrieving and/or collecting information about various endpoints. The endpoint record can use various components and processes when collecting and organizing information as in U.S. patent application Ser. No. 14/309,334, filed 19 Jun. 2014, which hereby incorporated in its entirety by this reference. The information can be populated through use of the communication platform, but some or all the information can be populated from outside sources.

The system can additionally include an application content generator 112, which functions to retrieve, format, or relay targeted application content. The media of the application content is retrieved and may be processed into a proper format. The application content generator 112 preferably operates in cooperation with the content messaging API no to translate requests into application content that is preferably executable/actionable on a targeted destination endpoint. The application content generator 112 can be a service running on a server within the communication platform. The application content generator 112 can obtain media from outside resources, which can be hosted on an internet server of the developer or any suitable party. The application content generator 112 may alternatively generate media in response to specified directions.

In one implementation, a developer specifies a pass by listing a URI at which the pass resource can be obtained. The application content generator 112 can be configured to fetch the resource from the URI and, depending on the file/content type (preferably determined by a mime-type), generate the appropriate media format. In one variation, the application content generator 112 is a headless browser that virtually simulates a client browser. The application content generator 112 can additionally be used for media messaging, where the application content generator converts a URI to an image, video, pass, calendar event, or other media format depending on the mime-type. The application content generator can include a module to transform and package content configuration files into a deliverable application content packages. For example, a set of media resources and a JSON file describing a pass can be packaged into a data object with a pass file type. In an alternative implementation, a developer (or more specifically a service or application of a developer) may provide a set of parameters that define intended content of the application content. The parameters used to specify a packaged application content file (one that can be transmitted) can be described as the application content configuration.

The application content generator preferably translates a normalized and standardized content specification into one or more targeted application content types. For example, the targeted application content types may be two similar applications that users commonly use. As another example, the targeted content types can include a first application content type recognized by a first operating system and a second application content type recognized by a second operating system. In some variations, resource identifiers are included in the application content configuration. The application content generator 112 may replace original resource identifiers with proxy system managed resource identifiers. The proxy resource identifiers preferably monitor access and redirect requests to the original resource identifier. By setting targeted application content to direct communications through the system, the system can provide reporting and notifications. For example, such proxy resource identifiers can be used to notify a user if application content was installed or when the user took a particular action.

The application content generator 112 may use one or more various signing mechanisms. Signing of application content may be used in some application types to verify the validity of the content. In one variation, the outside account systems generate and provide signed application content either beforehand (if it's a generic application content for multiple destinations) or at the time of making a request. For example, when wanting to send a digital pass, an application can send a request to the system, and the request may include a signed digital pass for a first application and a signed digital pass for a second application. The system decides if the first or second digital pass should be used. The application content generator 112 may include a storage solution for previously signed application content. As an additional or alternative mechanism, the application content generator 112 may include a credential manager where cryptographic tokens, keys, or credentials can be stored such that the system can sign application content on behalf of an account. In another variation, the system may use one or more cryptographic credentials controlled within the system. In this variation, an account holder may never need to establish credentials with outside channels because the system will sign on behalf of them. In yet another variation, the application content generator 112 may use a signing callback to delegate the signing action to a resource of the account's choosing. For example, when making a request to deliver a pass, the request will include all the normalized parameters as well as a signing callback URI. The system will translate the normalized parameters into a targeted format, and then send this object to the specified signing callback URI. The server or system located at the signing callback URI preferably performs the simple process of signing the targeted application content. This variation, functions to allow the credentials and signing to remain as a responsibility of the account holder, but translation and delivery is managed by the system.

2. Method for Delivering Digital Passes

Figure 3:
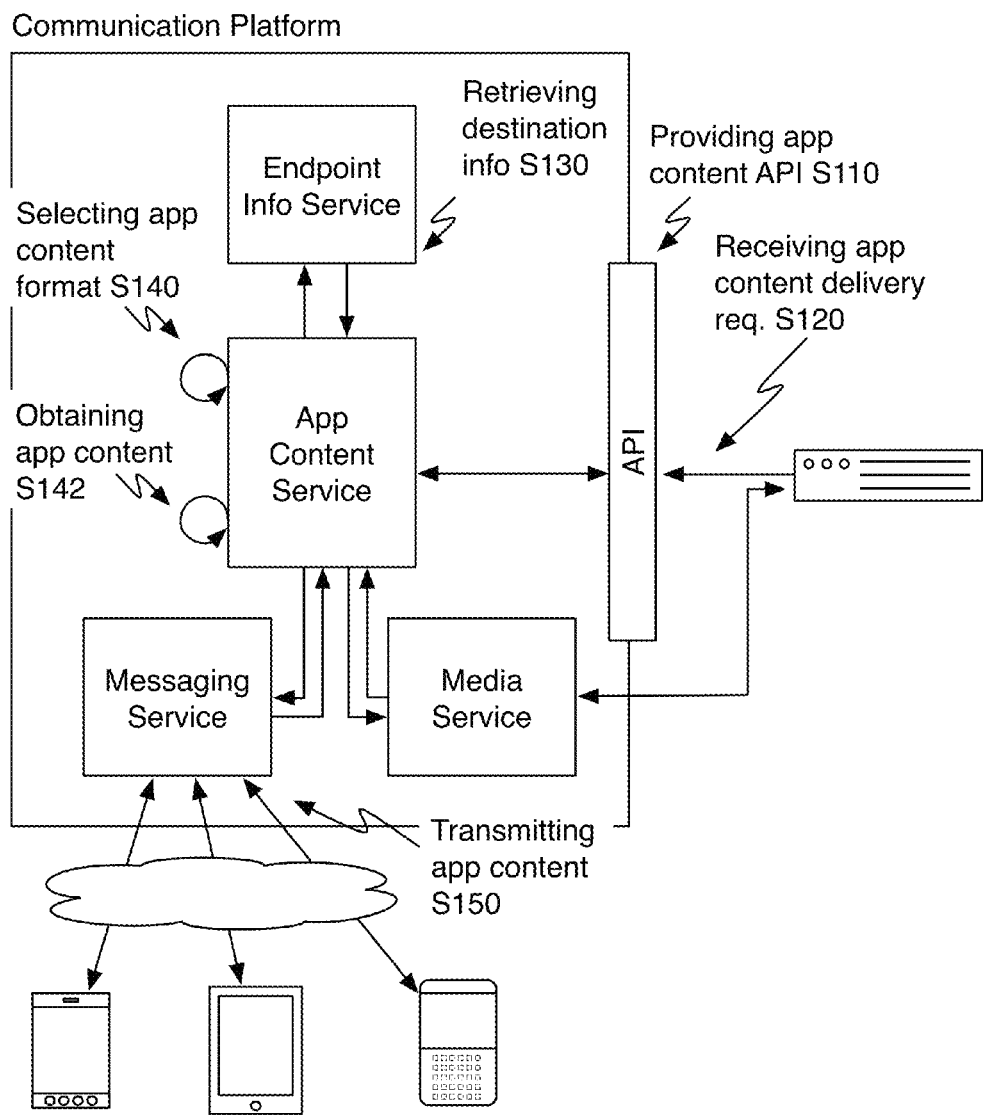
FIG. 3 is a schematic representation of a method of a preferred embodiment.

As shown in FIG. 3, a method for delivering application content of a preferred embodiment can include providing an application content messaging API S110, receiving a content delivery request through the application content messaging API S120, retrieving device information of a destination specified in the content delivery request S130, selecting the application content format S140, and transmitting the application content. The method functions to create a unified messaging solution for application content. The method enables the process of delivering application content to be simplified and offered as a convenient service to outside servers. In many cases, an individual application may not have sufficient reach or resources to accomplish such a procedure. For example, the method may have at least partial dependence on the capability of collecting information for a destination. The method preferably uses social aware heuristics or rules.

Figure 11:
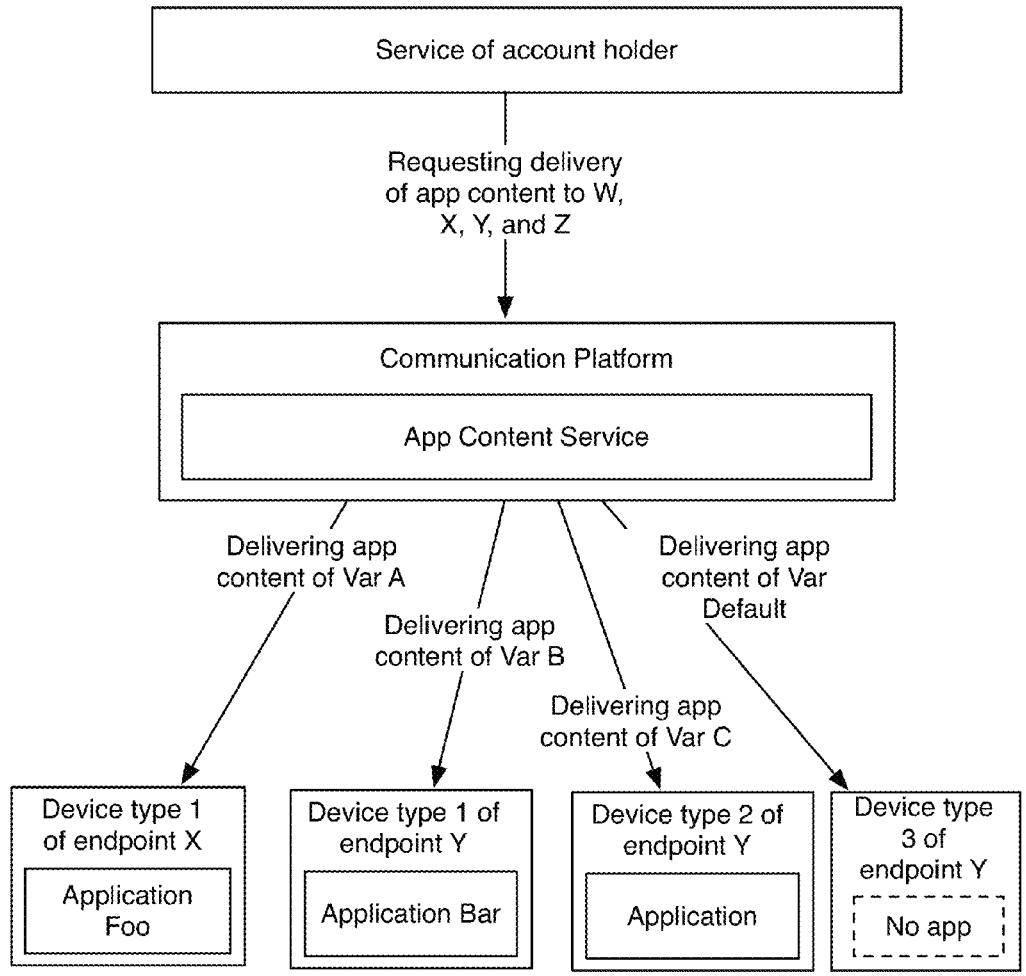
FIG. 11 is a schematic representation of application content dynamically delivered to a variety of destination and application types.
Figure 12:
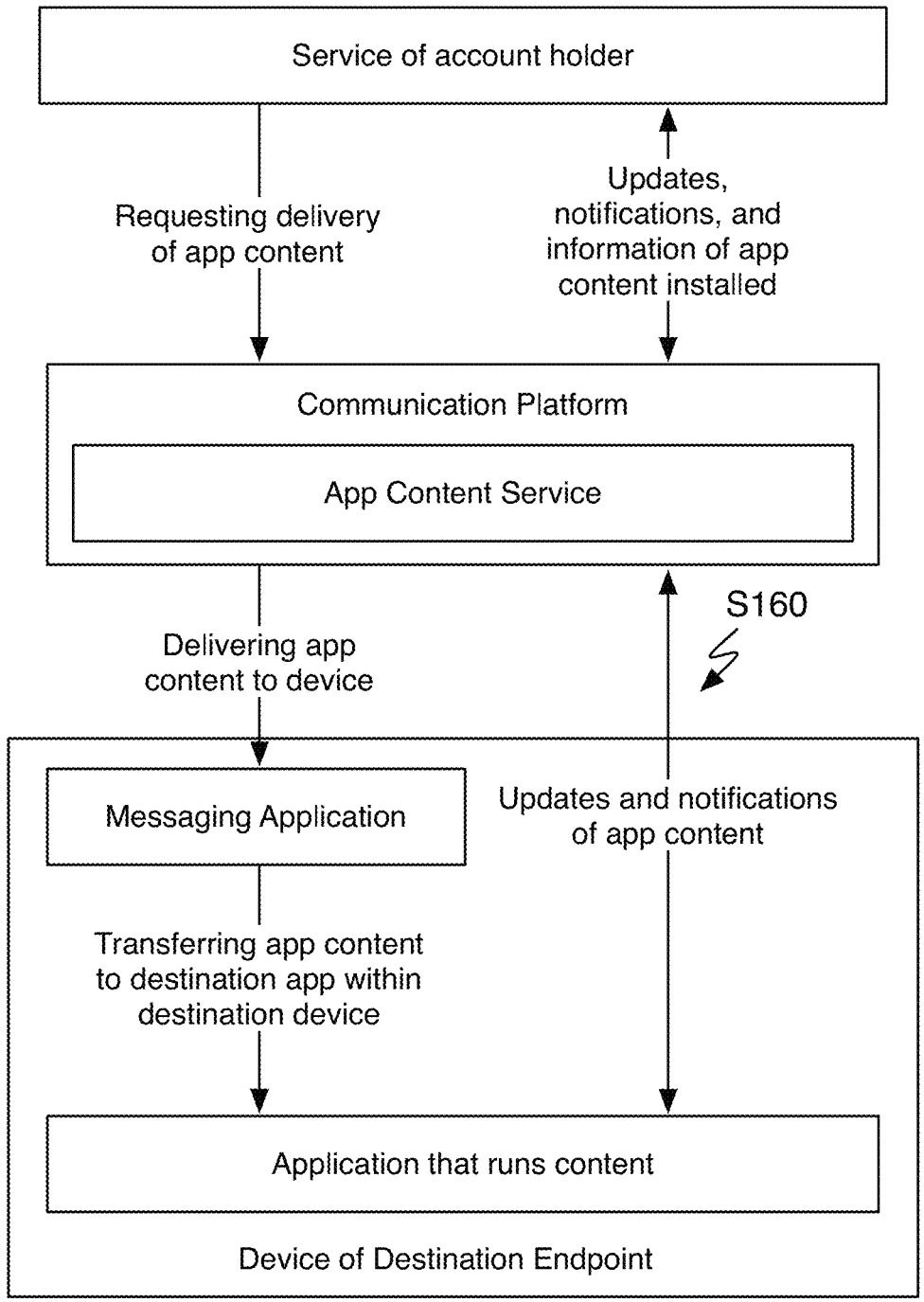
FIG. 12 is a schematic representation of the content and information flow between parties of the method.

The method may have particular application in the delivery of digital passes across a variety of device and/or target applications as shown in FIG. 11. The system can alternatively be used for delivering other application media. For example, calendar events, home automation configuration/modules, personal data modules, and/or other inter application content can additionally be sent and customized based on the device. Various calendar applications or event applications may use a format and set of features when representing an event. It can be challenging to provide calendar content in the format that matches the system used by a user. The method can address this issue by dynamically translating the intent of an event communication into an appropriate format. In a similar manner home automation or connected device modules may allow central applications to control various devices and systems. Some applications may function to consolidate the user experience and data in a single application or system. The method can address the similar issues of communicating such application content to a destination that matches the expected format. In another example, application specific content or settings can be delivered appropriately over telephony messaging. As shown in FIG. 12, the method preferably uses a messaging application such as an SMS/MMS app, a chat app, social networking app, email app, or other suitable communication app as an intermediary application leveraged in the transport and installation of the application content. Further, the application content system can be used for subsequent interactions such as notifications, updates, information, and other suitable interactions. The method is preferably implemented by a system substantially similar to the one described above, but any suitable system may alternatively be used.

In the implementation directed at delivering digital passes, the method can include providing a pass messaging API (e.g., S110), receiving a pass delivery request through the pass messaging API (e.g., S120), retrieving device information of a destination specified in the pass delivery request (e.g., S130), selecting the pass format according to the device information (e.g., S140), and sending the pass (e.g., S150). Passes preferably include any digital pass that can be collected with a plurality of different digital passes in a single application or operating service. For example, passes can include tickets, gift cards, coupons, loyalty cards, store payment cards, ID badges, invitations, and other forms of cards and passes that can be used with iOS's Passbook application, Android's Pass Wallet, or other operating systems and/or third party applications. The method abstracts away technical complexities and simplifies the manner in which a pass can be delivered and installed on a device. The method is preferably used by application and service providers/developers to enable easy transport and management of passes of end users. The method uses MMS as a transport protocol for delivering passes, but any suitable communication protocol can be used to deliver the pass media resource, and in some cases may be dynamically selected based on the conditions of the destination device. The method additionally functions to normalize the interactions taken by a developer such that a single interface can be used to deliver passes to a wide variety of device types. Updates and changes to the underlying targeted formats may not impact the use of the normalized interfaces used by account holders. Further, the method can simplify the maintenance process of maintaining multiple applications for different applications.

Block S110, which includes providing an application content messaging API, functions to facilitate programmatic interaction with a service or platform. The application content messaging API is preferably provided by a multi-tenant communication platform as described above. The communication platform can provide any suitable array of services and functionality including only the content delivery and interaction variations described herein. The application content messaging API may be integrated with a messaging API that enables delivery of text or media. The content delivery features of the API can be automatically invoked through detecting that the media to be delivered is an application content media type. The application content messaging API is preferably a RESTful API but may alternatively be any suitable API such as SOAP. The API preferably works according to an HTTP request and response model. HTTP requests (or any suitable request communication) to the communication platform preferably observe the principles of a RESTful design. RESTful is understood in this document to describe a Representational State Transfer architecture as is known in the art. The application content messaging API can include several resources. An exemplary API call can include an HTTP POST to initiate a new action or modify a resource and an HTTP GET to read data or query information about a resource. The API may alternatively use alternative forms of an interface. In one preferred implementation, the application content messaging API can include a pass API resource that can be used to transmit a pass to at least one destination. An HTTP POST to the pass resource initiates the transmission of a specified pass to a specified destination. An HTTP GET to the pass resource can return a list of the delivered passes. Each transmitted pass is preferably assigned a passID within the communication platform. A transmitted pass has a passID resource that can be used to access specific passes. Since passes are often delivered to a single user. A passID corresponds to a particular instance of a pass transmitted to one user device. The passID resource can be used to query information about a particular pass instance. Pass instance information can include delivery status (was the message received), installation status (was the pass installed by the user), the type of pass, and other suitable information. For example, a developer or application can send a HTTP GET message to a passID resource of "/pass/1234", and a json response can be returned that specifies if the pass was delivered, if the pass was installed, and if the pass is an iOS, Android, or static pass. A developer can update the pass by submitting an HTTP POST message to "/pass/12434", and in response, a push notification is delivered to the device to update the pass. In one variation, a message resource can be overloaded and be used for SMS, MMS, passes, and messaging of other media types. The handling of the media can be automatically determined based on the content type specified through a request. The application content messaging API service can include a pass credential database that stores developer credentials of an account that can be used in signing passes. The provided application content messaging API can alternatively use any suitable interface.

Alternatively or additionally the system may include providing a set of application content directives. The application content directives may be programming/scripting primitives, functions, or other programming mechanisms that can be integrated into programmatic actions. For example, a set of telephony instructions may be provided that enable the specification and triggering of application content delivery. Alternatively, a graphical user interface may allow for manual control of the delivery of application content. For example, a user interface may enable an account holder to enter application content parameters, enter one or more destination endpoints, and then send the request.

Block S120, which includes receiving a content delivery request through the application content messaging API, functions to initialize the delivery of application content to a destination endpoint. The content delivery request can be received as a HTTP API request from an application/service of the account. The content delivery request is preferably authenticated through a suitable mechanism as being made on behalf of an account. Multiple accounts make multiple independent content delivery requests. The API request includes at least one destination and an application content configuration. The content delivery request can alternatively be initialized from an application instruction. For example, a telephony application being processed in response to a voice call, SMS message, or MMS message. For example, a telephony application instruction called "pass" could be used to specify a destination and a digital pass configuration for the application content. The method support one or types of application content. In one preferred implementation, the application content is a digital pass and will include pass configuration. Other types of application content may additionally or alternatively include event content, personal health content, home automation content, connected device modules, or other suitable forms of application content. The destination can be a communication endpoint such as a telephone number, a SIP address, application account identifier, and/or any suitable identifier of a destination. The application content configuration can be a parameter that references the content configuration resources to be delivered as shown in the exemplary pass delivery request in FIG. 4.

In the case of a digital pass, a pass is generally configured through a data object or collection of data objects defining properties of the pass as well as media resources used in rendering the pass such as images, audio files, video files, business logic, application code, or other suitable resources. The pass configuration resources can specify a web service parameter that determines the web service used in pushing updates to the pass. The pass configuration is preferably specified by a URI of the pass package files. In a preferred implementation, the pass configuration resources are stored on a server of the requesting account holder. Alternatively, the pass configuration resources can be uploaded to the communication platform.

Figure 5:
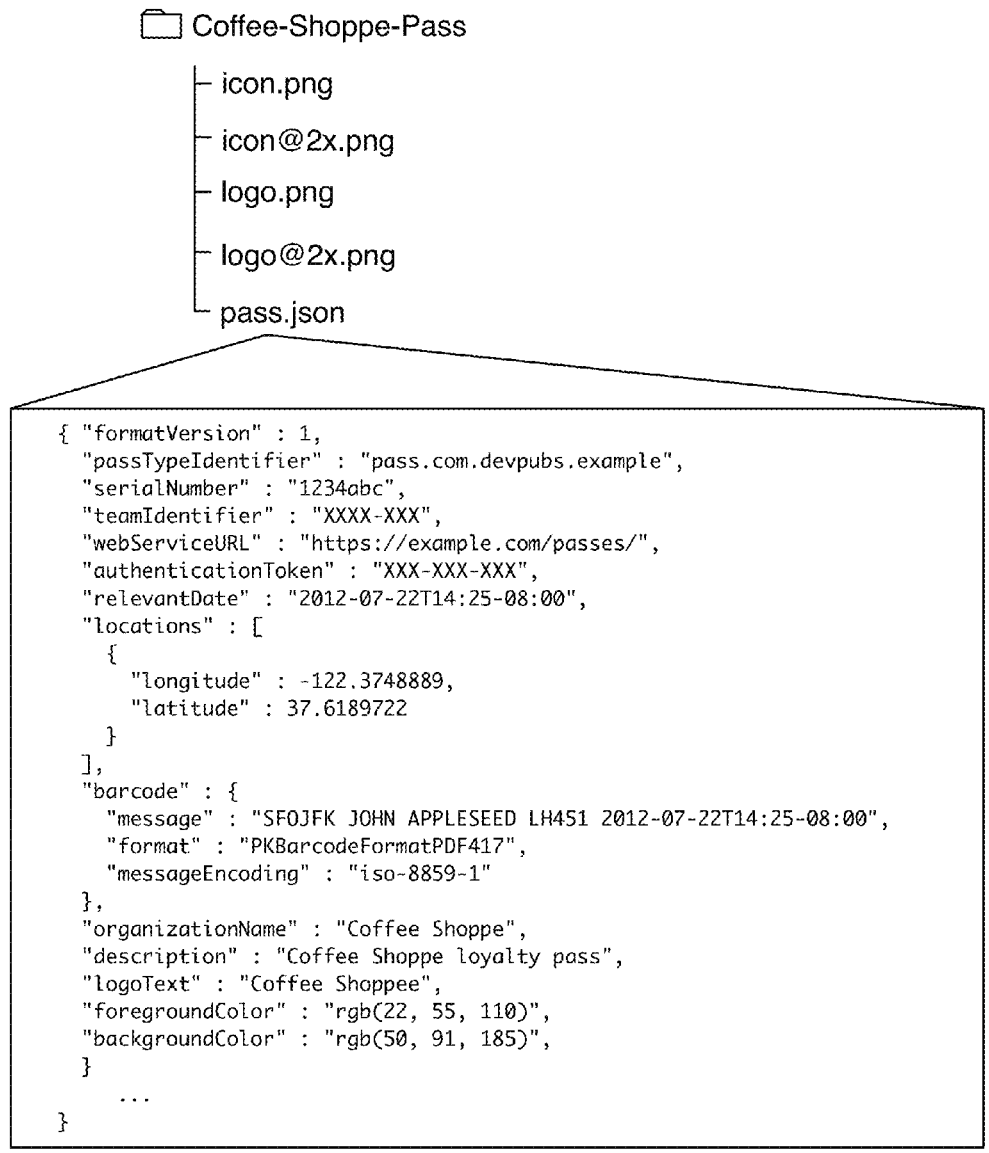
FIG. 5 is an exemplary representation of configuration files of a pass.

Application content configuration can be a normalized configuration or a destination-formatted configuration. A normalized configuration is a generic normalized format used within the communication platform for defining configuration of the application content. The standardized syntax can be generalized to apply to a variety of application formats. The normalized configuration could be an agreed upon standard, a customized standard within the platform ecosystem, or tied to a destination format of an outside ecosystem (e.g., one of iOS or Android). An exemplary benefit of a normalized configuration is that all accounts conform to one format and the configuration can be reliably translated to other destination formats. Destination formats are preferably the media formats that can be natively interpreted by a device and/or application. The destination format for pass configuration may be a Passbook package or files for iOS, a Google Wallet object or configuration files, a Samsung Wallet pass object or configuration files, or any suitable data object, package, or configuration file(s) for an operating system or specific application. As shown in FIG. 5, an iOS pass configuration is a package that contains a pass.json file that defines parameters of the pass and the image assets such as the logo and icons. As described below, the method can automatically transform passes between destination formats, and as a result, developers only need to configure a single pass resource. One potential benefit of a destination format is that a destination format can leverage the full functionality of at least one destination. The features of the passes may not be fully supported across different operating systems/applications. If one destination format supports a particular feature, then using that destination format can leverage that feature. When transforming the pass to other formats, that feature may not be supported on other devices, but the developer can at least get support in one of the destinations.

Figure 6:
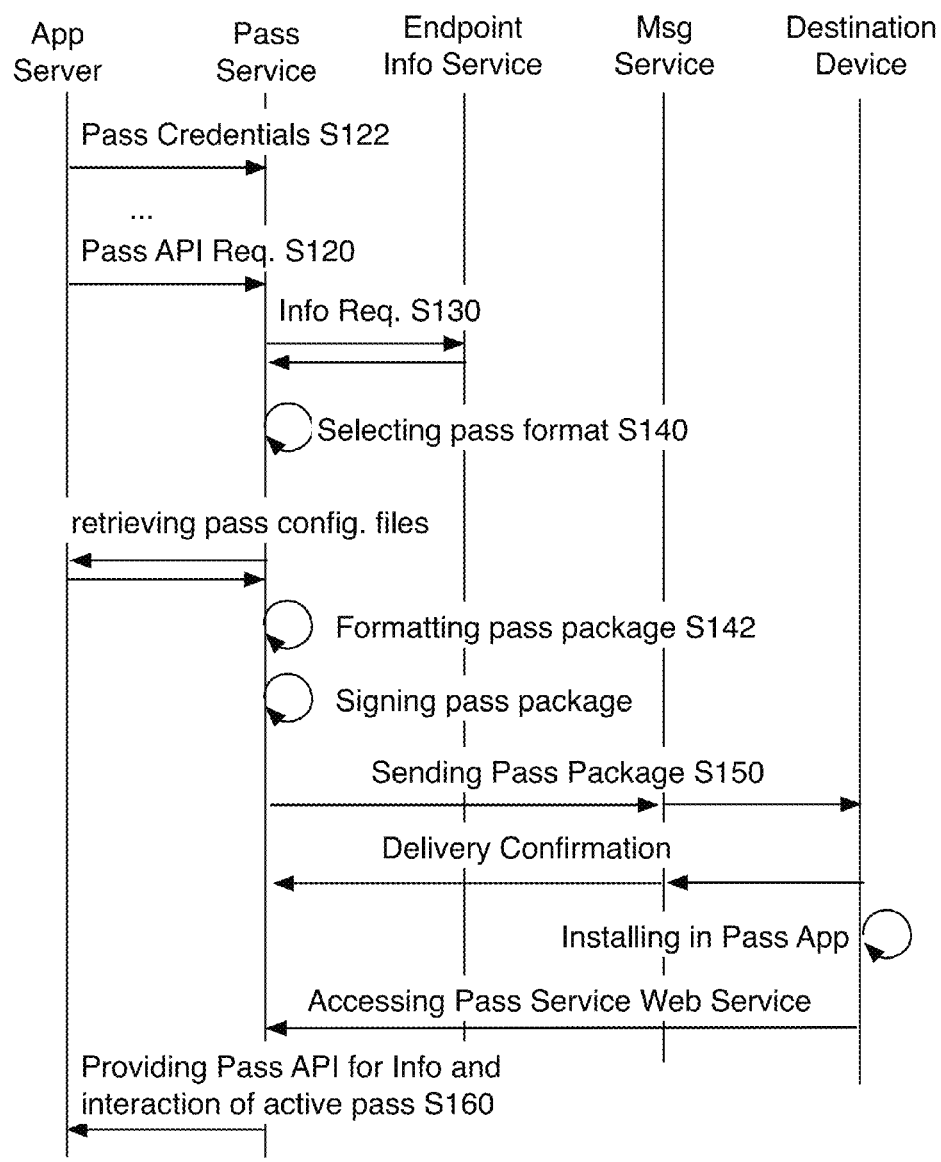
FIG. 6 is a communication flow representation of a method of a preferred embodiment.

The application configuration files referenced/provided by an account are preferably kept in a raw format and are not cryptographically compressed into a package format until prior to delivery. The raw format functions to enable the platform to translate between application content formats. The raw format configuration files are preferably packaged using the certificates obtained in block S122 and as shown in FIG. 6. The platform can additionally or alternatively be configured to support application configurations that were pre-packaged. For example, a pass configuration could be a signed and packaged application content object. In one variation, the method can selectively handle compressed pass packages by only providing delivery to that specific type of destination. Additionally or alternatively, pass configurations can be specified for each destination by an account holder. The application content messaging API can provide a mechanism to specify which packaged application content is targeted at which specific destination formats. For example, the pass delivery request may specify a URI of a Passbook package for iOS devices, a URI of a pass wallet package for Android wallet, and a URI of an image resource for non-smart phones. Since the requesting account may not know which application content format is required, all options can be provided. If application content is not specified for a specific device category, then one of the application content configurations can be used as a default and converted into a suitable format for the device category. By specifying a specific application content resource, a developer can leverage various features and attributes of a specific pass application. Targeting destination formats can additionally enable developers to cryptographically compress application content into a package.

In some cases, the application content format will include a cryptographically signed application content format. A cryptographically signed application content format will preferably require the use of a key, token, or other credentials to sign the application content. The credentials may be used within the application to authenticate the authenticity of the application content (e.g., should it be installed, is it trusted) but may additionally or alternatively be used to embed private information or to enable other features (e.g., push notifications). Prior to receiving a content delivery request, the method can include receiving the content credentials of the account S122. The content credentials are any of the certificates, keys, or account identifying information of the account that is used when creating an application content object file. Application content package transformation described below can include cryptographically compressing a set of files into a package. An outside party frequently issues the certificate. The outside party is often the operator of the application such as Apple for iOS devices or Google/Samsung for Android devices. The certificate will be used in generating the application content packages. For example, a first account will submit the Apple developer certificate and the Google developer certificate to the communication platform. Those certificates are stored and are used to cryptographically compress pass configuration files into a pass package.

Block S130, which includes retrieving device information of a destination specified in the content delivery request, functions to retrieve data on the device environment of the intended application content. The device information is preferably retrieved from a telephony endpoint information resource as described above. The telephony endpoint information resource preferably maintains a database of information about a plurality of endpoints. The information is preferably obtained from outside sources and through characterizing the endpoints within the communication platform. The device information preferably includes operating system information version data and can additionally include installed application information, capability listing, language, and other information. The application information may include what applications are known to be available but may additionally include preference information related to installed applications. For example, one user may have a first and second application that use different application content formats, but the user more frequently uses the first application. Preferably, the method will result in the transmission of application content in a format recognized by the preferred application. At least the information usable in selecting the right type of destination format of a pass is retrieved.

Use of the method can additionally facilitate the population and vetting of destination endpoint information. In the situations where interactions with the application content can be confirmed, the destination device may be confirmed to support that application content format through detection of related interactions. For example, when proxying a subset of content with a redirection tracking link, the communication platform can confirm when an application content item is installed by a particular destination endpoint. Similarly, when a push notification, update, or other requests are sent to the application content, a response can indicate that the application content was successfully installed and that the destination endpoint at least supports that application content format.

Block S140, which includes selecting an application content format according to the device information, functions to determine the destination format of application content. The device information is used in selecting the type of application content to be delivered. In a first variation, there can be distinct types of destination formats that are mapped to particular device information. For example, there may be an iOS type, an Android type, a default smart-phone type, and a basic type. In the variation of pass content, the iOS type can correspond to a Passbook pass; the Android type can correspond to a Pass Wallet type; the default smart-phone type can correspond to a web application type; and the basic type can correspond to a static image version of the pass. In some cases, there may be two possible types supported by a device such as when a third party pass application and a pass application of the operating system exist on the same device. In this variation, the developer can set preference, the preference of the user can be determined based on usage of the applications, or the system can default to one of the options. Historical usage of previous delivered passes can additionally be used in selecting between multiple options. For example, if a user has never installed a Passbook delivered to a given endpoint, then a static pass can be used in subsequent pass transmissions. Additionally, the delivery mechanism may be dynamically selected. Preferably, MMS is used as a communication channel, but if MMS is not supported on the device, then an SMS message with a link to a pass installation web page, a pass web app, or a static image of a pass can be delivered. Similarly, if a pass application installed on the device includes an API for communicating the pass directly to the app then that communication channel could be used.

Selecting the application content format can additionally include obtaining application content in the application content format S142, which can function to transform the application content resources from one format to a second format. The process of obtaining the application content can include requesting and receiving, generating, translating, and/or any suitable transformation of the original content request to a data object or package that can be delivered to a destination endpoint.

If a destination application content package (one that matches the selected application content format) is not provided by a developer, one is preferably created appropriately for the destination. The transformation can be from a generic format to a destination format in the situation where a generic format is the specified configuration. The transformation can alternatively be from a first destination format to a second destination format. In the variation of transforming from a generic format to a destination format, the information from the generic format is mapped to a template of the destination format. The generic format configuration is preferably a generalized set of parameters and resources that can map to several different types of destination formats. A normalized configuration can include a format version, a content type identifier, a serial number, a user/developer/team identifier, a web service URL, authentication tokens, location markers, a barcode (along with caption, format, encoding and the like), company name, description text, logo text, foreground colors, background colors, content type, header text and labels, various text fields and values, localization of the text fields, media resources (images, video, audio, etc.), and/or any suitable parameters and assets. These parameters can be mapped to corresponding parameters of a template of an application content of the destination format. For example, a title parameter is mapped to a title parameter of a Passbook, the title parameter of a Pass Wallet, the title of the webpage in a web app, and the header text in an image of a static pass. Two different destination formats may not be aesthetically or functionally identical when rendered in the application but they preferably adhere closely to the specifications of the generic format. When transforming from a first destination to a second destination, the parameters of the first original destination format is preferably mapped to parameters of the second destination. The mapping can be stored for each type of supported transformation. Passes will often share common attributes such as titles, descriptions, logos, colors, and the like—and these shared attributes can be mapped between two formats. This type of format transformation is preferably performed when the account specified the pass in the native format of some device. For example, a Passbook pass configuration may be specified by a developer. If the destination device is an Android device, then the Passbook can be transformed into a Pass Wallet or other suitable pass format.

Figure 7:
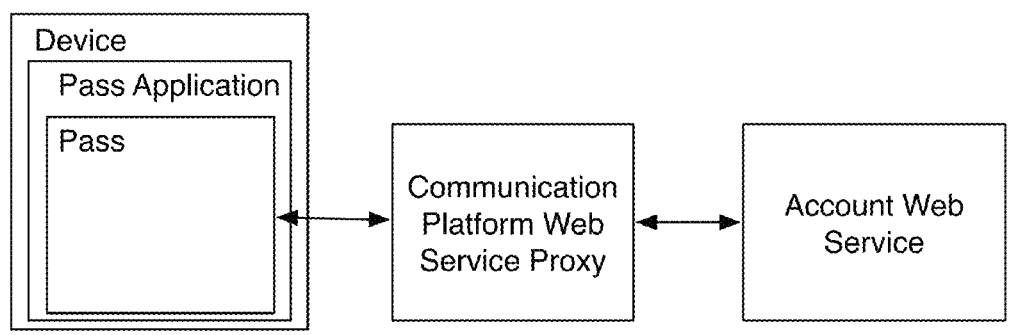
FIG. 7 is a schematic representation of the web service proxying of the communication platform.

In one variation, the pass configuration will specify a web service URI, push notification parameters, or other network communication parameters to enable remote updates of the pass once the pass is installed. During transformation, the platform preferably replaces the web service URI of the account holder with a web service URI of the communication platform. Accordingly, the method includes proxying at least a subset of content in the application content object, wherein the content is proxied by platform controlled resources. The proxied platform controlled resources are then substituted or otherwise used in a generated application content package. In other words, obtaining the application content includes generating the application content according to the directions of the application content configuration but wherein the application content configuration is modified to include the substitution of the platform controlled resources (e.g., the media and/or references to media). This functions to modify the pass to communicate through the communication platform. As will be described below, this can enable tracking of application content installation as well as enabling a unified interface for updating application content on multiple devices. The web service URI of the account holder can be saved and used later. Preferably, URI references are replaced with tracking URIs that enable the platform to detect when the resource is accessed and what the data and parameters passed in. Functionally, the proxy URI reference redirects to the original URI reference so that normal operation can continue. For example, the communication platform can act as a web service proxy between the application content and the web service of the account holder as shown in FIG. 7. The variation further comprises monitoring the platform controlled resources and can include notifying an account during access of the platform controlled resource. Notification of an account may include modifying a log file to which the account has access; updating a persistent network connection (e.g., pushing information over a websocket or the like); submitting an application layer communication to a specified callback resource identifier destination of the account; and notifying in any suitable manner. The callback resource identifier preferably receives a GET or POST HTTP(S) communication with data that embeds information relating to the event. The application layer communication can include HTTP, SPDY, or any suitable application layer protocol. For example, the communication platform may contact a notification callback URI of the account when particular events happen. The notifications can be for when the application content is installed, when the application content is used, and in response to other suitable events.

The method can additionally include detecting the application content configuration format and selectively applying a transformation, which functions to enable a content delivery request to specify application content in any allowable format and the application content will automatically be translated into a suitable format. Destination formats can additionally be cached so that previously transformed application content can be reused within the system. The transformation preferably uses the raw application content configuration files provided or referenced by the request. Additionally or alternatively, the pass configuration files can be transformed into the appropriate file type depending on the destination. In some cases, a certificate provided by the account is used to cryptographically compress the pass file assets into an appropriate package. Various approaches may be used to cryptographically sign the content.

In a first variation, content credentials (e.g., cryptographic tokens and keys) are stored and managed within the communication platform as described in block S122 and shown in FIG. 6. The appropriate content credentials can be accessed and used in signing the application content with the cryptographic token of the account. Signing can additionally include packaging the application content into a signed package. Different application content types may have varying signing requirements.

Figure 8:
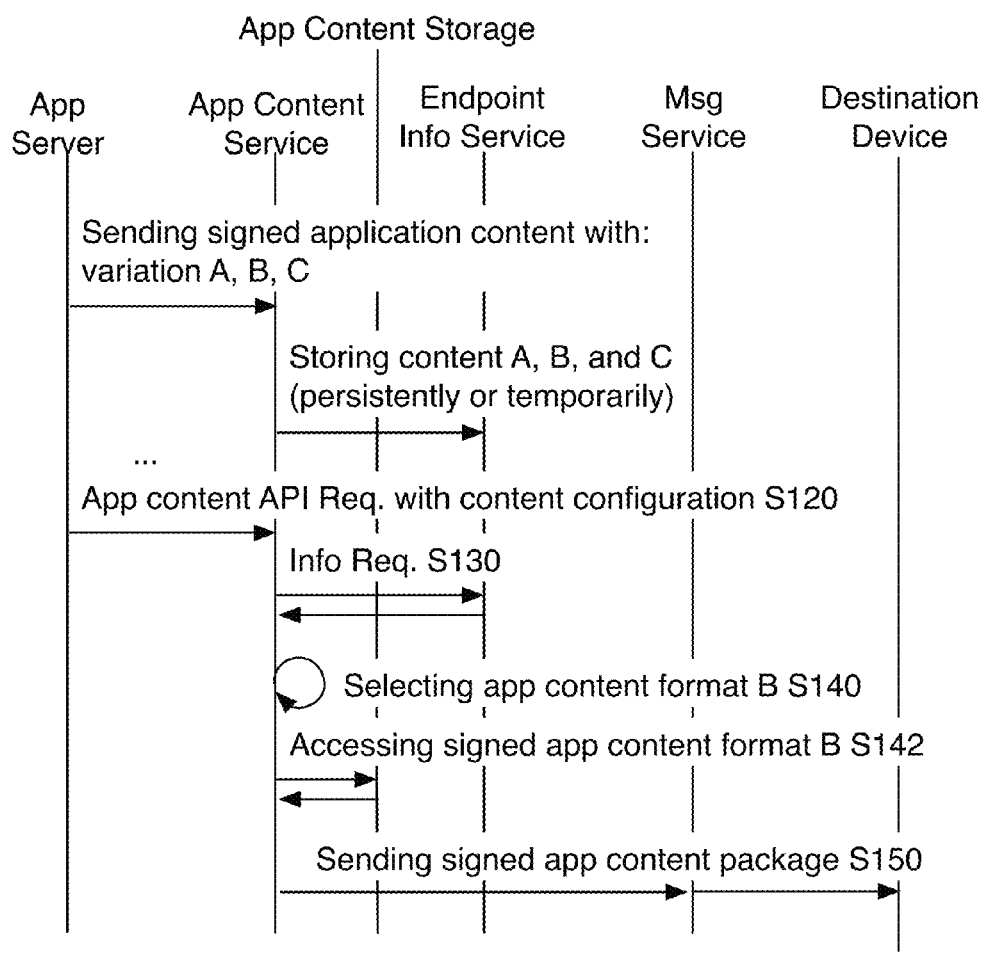
FIG. 8 is a communication flow representation of a variation of signing application content.

In a second variation, obtaining signed application content can include receiving and storing a cryptographically signed application content object of an account and transmitting the stored cryptographically signed application content object if the application content format is the cryptographically signed application content format as shown in FIG. 8. In this variation, the account managers will be responsible for signing and forming the application content. An account holder will preferably upload or provide multiple application content types. The communication platform will select which one should be delivered. The signed application content packages may be uploaded or referenced through a URI.

Figure 9:
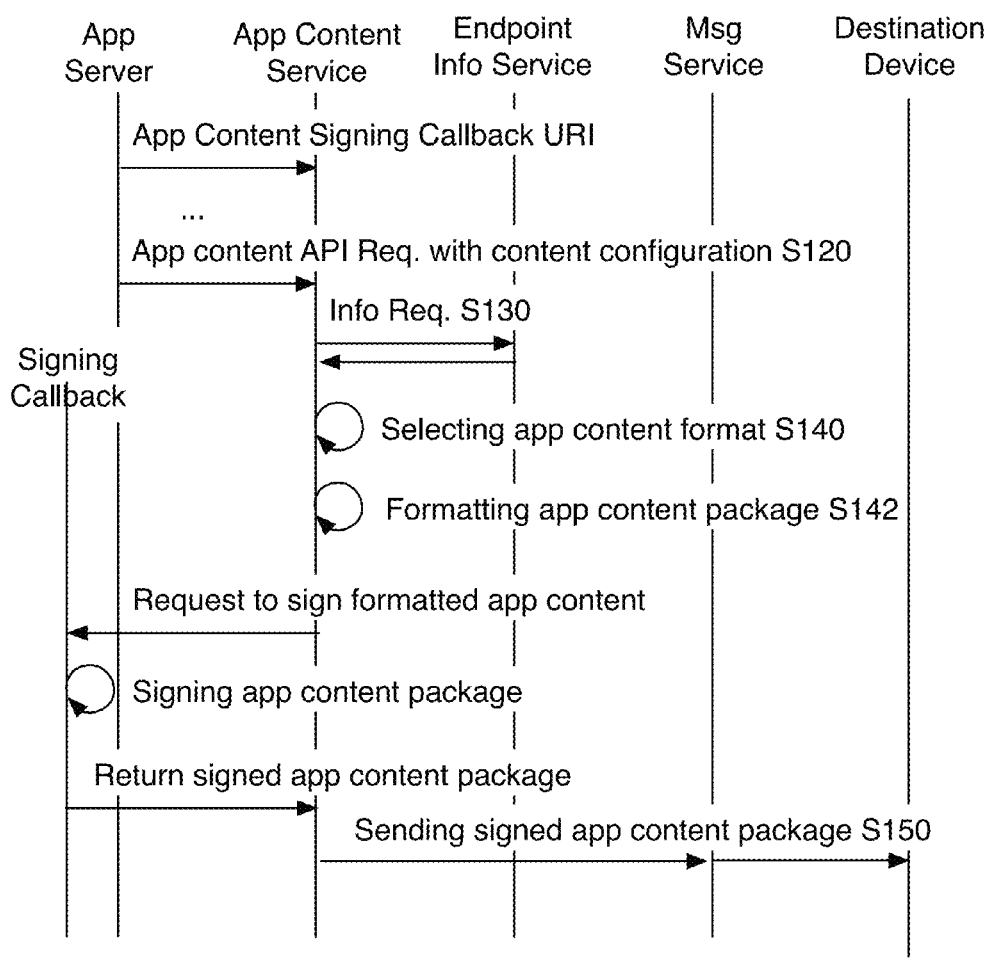
FIG. 9 is a communication flow representation of a variation of signing application content.

In yet another variation, the method can include receiving a signature callback of an account and transmitting a signature request to the signature callback when the application format is a cryptographically signed application content format as shown in FIG. 9. This method functions to enable the communication platform to select the correct format, perform the base translation of content intent to a raw destination content format, but then allow signing of the content package to the account manager. The raw destination content is preferably communicated to a signing callback URI specified by an account. The signature request preferably includes unsigned application content and a cryptographically signed application content object is received in a response to the signing request. The resource at the signing callback URI can complete the signing process and then return a signed application content package. Content credentials do not need to be shared with the communication platform and can be stored within the system.

Figure 10:
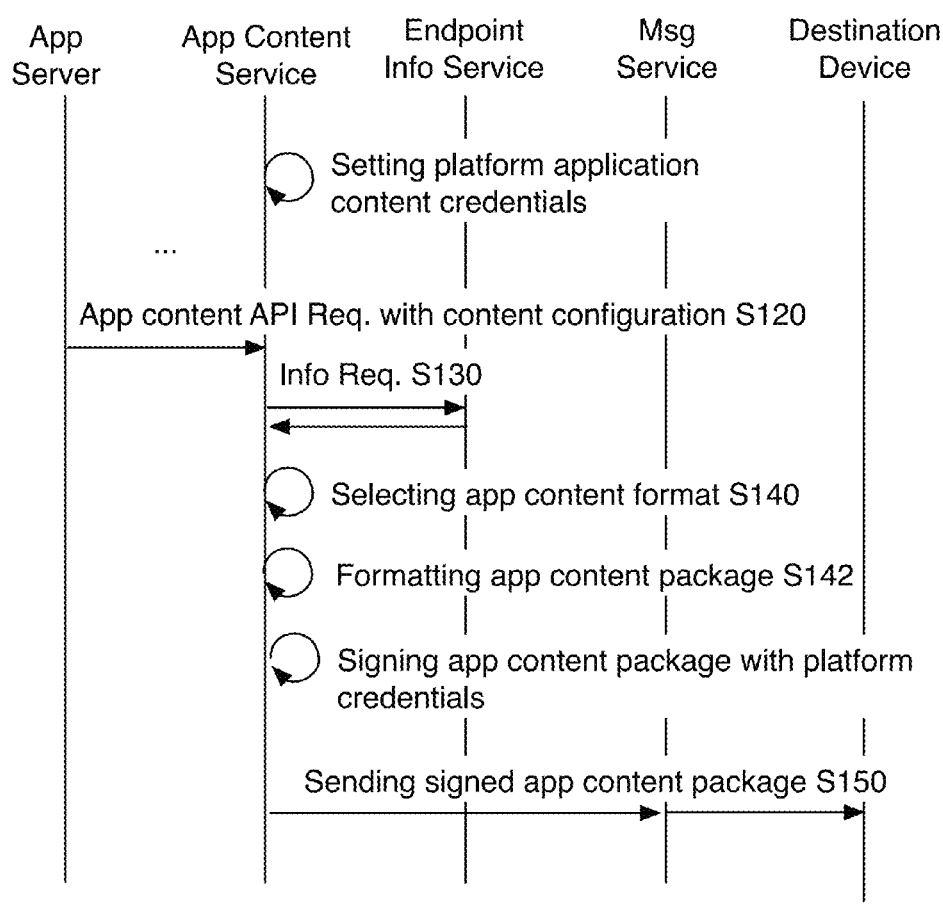
FIG. 10 is a communication flow representation of a variation of signing application content.

In yet another variation, the method can include generating platform credentials and using those self managed credentials in signing on behalf of an account as shown in FIG. 10. In this variation, an account holder may never need to establish credentials with outside channels because the system will sign on behalf of them.

Figure 2A:
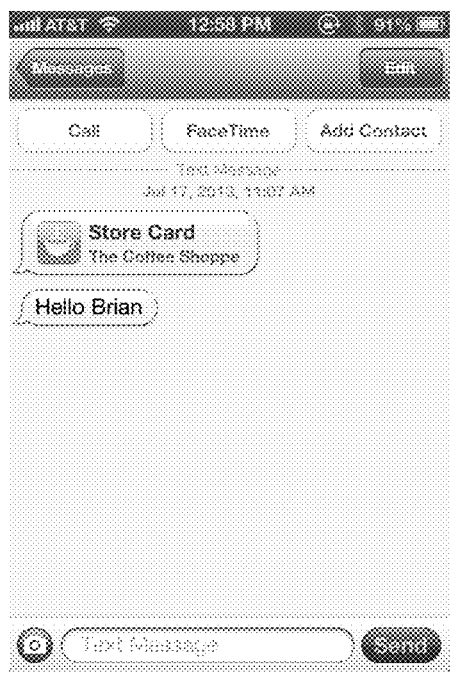
FIGS. 2A and 2B are exemplary screenshots of a delivered pass and a pass installed in a pass application.
Figure 2B:

Block S150, which includes transmitting the application content, functions to send the media in a selected format. The application content is preferably communicated as an MMS message with a mime-type of the file format of the application content package. The communication channel can alternatively be SMS, email, IP messaging, or an application specific communication channel. At the device, the application content is received in a MMS message. The device preferably renders the application content in a media item preview within the messaging application. In the digital pass variation, the pass is shown as a thumbnail preview image of the pass, as shown in FIG. 2A. Upon receiving user selection (e.g., tapping the preview), the relevant application is opened and the application content is installed in the application as shown in FIG. 2B. For example, selecting or tapping a pass in a messaging application will redirect to an appropriate pass application and the pass will be added to the application. SMS can alternatively be used. Instead of delivering the application content media, a link is delivered, which when clicked opens a webpage to the application content installation page or a web app version of the content. Alternatively, the link can be to a static image of the application content. For example, a pass may be shown as a webpage displaying the barcode of the pass. Alternatively, an IP based messaging communication can alternatively or additionally be used. IP based messaging can target particular applications. Social network messaging systems and internet chat applications are examples of applications that use IP based messaging communication. In some instances, an application may natively support programmatic pushing or uploading of the pass to the user's application. For example, pass applications may integrate with push notifications so that once installed push updates can be communicated to the device. Similarly, a pass may be updated to a new state, a new version, or expired, or changed in any suitable manner.

In addition to providing a unified interface to delivering passes and/or application content, the method can additionally provide further application content interaction and information. As a first additional aspect, the method can include tracking of content status S160, which functions to provide programmatic access to the state of a delivered pass. Information about a delivered pass is preferably accessible through the API. The information can include delivery status (was the message received), installation status (was the pass installed by the user), the type of pass (what destination format was used), usage status (was the pass used and/or when), and other suitable types of information. Delivery status is preferably indicative of the MMS delivery status. The installation status can be tracked by the communication platform when the application content contacts the web service of the communication platform or accesses other resources controlled by the communication platform. Proxy resources and URIs may have been used in the application content. Such proxy resources can be monitored and used to measure and report on activity. The type of application content is a description of the format of application content package delivered to a device. Boolean indicators of feature capabilities can additionally be provided which can be based on the destination format and the manner in which the pass configuration was provided by the account holder. As an additional aspect, the content API resources can be used in directing further interaction with the application content. Each application may provide different mechanisms for interacting with application content. In many cases, the applications provide a mechanism for a developer to update application content through a web service. During the transformation of the application content configuration, the communication platform can reconfigure the application content to communicate with the communication platform in place of the web service of the account.

In a first variation, the developer uses an API interface of the communication platform to interact with application content updates. The API interface can allow a developer to specify a push notification to an application, update or modify application content, delete or invalidate an application content item, increment variables of the application content, or make any suitable change to the application content supported by the application. These actions are preferably abstracted so that a single interface can enable these actions across different applications. The communication platform translates the content interaction requests made by an account holder into appropriately formatted network communication to the application or application content. If the destination application of a particular content item does not support an update feature, an appropriate error message or backup action may be issued. In a second variation, the communication platform acts as a content update proxy and relays communications between the application content and a web service of the account holder. The communication platform can be substantially transparent to the web service, and the account holder can maintain full control of the application content as if the communication platform was not used. In another variation, a content delivery request can specify that the communication platform should not be used as an intermediary web service. The application content can be simply installed on the application and then function as a normal pass.

The use of an API interface can additionally provide group or batch interaction capabilities. Since all passes can have information stored in the scope of an account an account can make group calls to a subset of application content in parallel. For example, pass updates can be made to multiple passes by specifying a descriptor that relates to a subset of the passes.

The system and method of the preferred embodiment and variations thereof can be embodied and/or implemented at least in part as a machine configured to receive a computer-readable medium storing computer-readable instructions. The instructions are preferably executed by computer-executable components preferably integrated with the pass delivery service of the communication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising: at a multi-tenant communication platform system:
providing a digital pass messaging application programming interface (API) of the platform system;
receiving a digital pass delivery request from a first external system of a first platform account of the platform system, through the digital pass messaging API;
responsive to the digital pass delivery request from the first external system, the platform system retrieving device information of a destination endpoint specified in the digital pass delivery request, the device information indicating that the destination endpoint has a first operating system, wherein the first operating system is different from a second operating system, and wherein the first operating system has a first digital pass format;
based on the device information, selecting the first digital pass format from a set of digital pass formats including at least the first digital pass format and a different second digital pass format, and obtaining a digital pass in the first digital pass format; and
transmitting the digital pass in the first digital pass format from the platform system to a system of the destination endpoint, the system of the destination endpoint being external to the platform system, wherein the digital pass in the first digital pass format is a digital pass for a digital pass application of the system of the destination endpoint.

2. The method of claim 1, wherein the set of digital pass formats includes at least one cryptographically signed digital pass format.

3. The method of claim 2, wherein the digital pass is a package that defines a digital pass object.

4. The method of claim 2, further comprising receiving a cryptographic token of the first platform account; and wherein obtaining the digital pass in the first digital pass format when the first digital pass format is a cryptographically signed digital pass format comprises signing the digital pass with the cryptographic token of the first platform account.

5. The method of claim 2, further comprising receiving and storing at least one cryptographically signed digital pass object of the first platform account; and transmitting the stored cryptographically signed digital pass object if the first digital pass format is the cryptographically signed digital pass format.

6. The method of claim 2, further comprising receiving a signature callback of the first platform account; and wherein obtaining the digital pass comprises, when the first digital pass format is a cryptographically signed digital pass format, transmitting a request to the signature callback, the request including an unsigned digital pass, and receiving a cryptographically signed digital pass object in a response.

7. The method of claim 1, wherein the digital pass delivery request specifies digital pass configuration; and wherein obtaining the digital pass comprises proxying at least a subset of resources specified in the digital pass configuration with platform controlled resources and generating the digital pass as directed in the digital pass configuration with the substitution of the platform controlled resources; and monitoring access of the platform controlled resources.

8. The method of claim 7, further comprising notifying the first platform account during access of the platform controlled resources.

9. The method of claim 7, wherein notifying the first platform account during access of the platform controlled resources comprises transmitting an application layer communication to a callback URI destination of the first platform account.

10. The method of claim 9, wherein the set of digital pass formats includes a format of a first application type and at least a second application type.

11. The method of claim 1, wherein the digital pass delivery request includes normalized digital pass parameters; and wherein obtaining the digital pass comprises translating the normalized digital pass parameters into a digital pass format of the destination endpoint.

12. The method of claim 11, wherein the device information indicates the operating system of the destination endpoint, and the format of the first application type is for a first operating system and the format of the second application type is for a second operating system.

13. The method of claim 1, wherein transmitting the digital pass comprises transmitting the digital pass over a multimedia messaging service (MMS) channel.

14. The method of claim 1, wherein transmitting the digital pass comprises transmitting the digital pass over an email channel.

15. The method of claim 1, further comprising receiving a notification request from the first platform account and pushing the notification to the digital pass.

16. The method of claim 1, wherein the digital pass delivery request specifies multiple destination endpoints and wherein retrieving device information of a destination endpoint, selection of the first digital pass format, obtaining the digital pass and transmitting the digital pass is completed for each of the specified destination endpoints.

17. The method of claim 1, wherein the platform system transmits the digital pass in the first digital pass format to the system of the destination endpoint via a multimedia messaging service (MMS) channel of the platform system, and wherein the first external system is an application server system.

* * * * *